Aug. 6, 1968 M. D. MARTIN 3,395,598
DIE RULES
Filed July 28, 1965
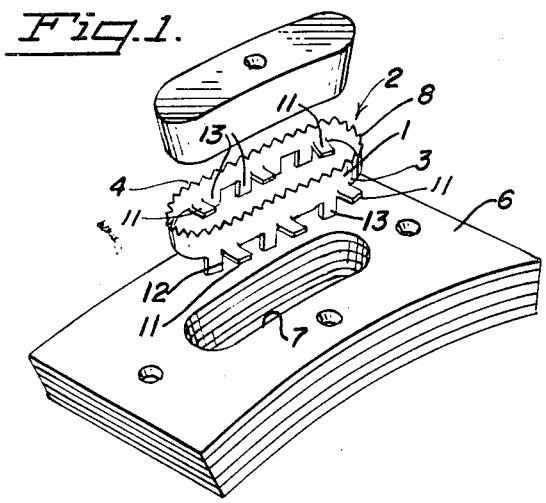
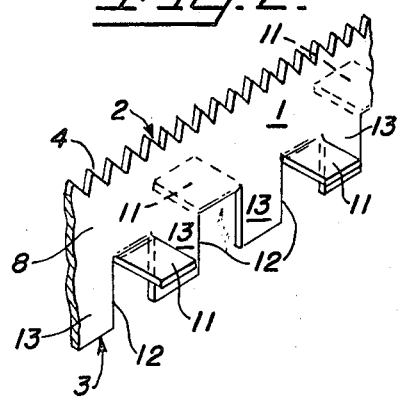
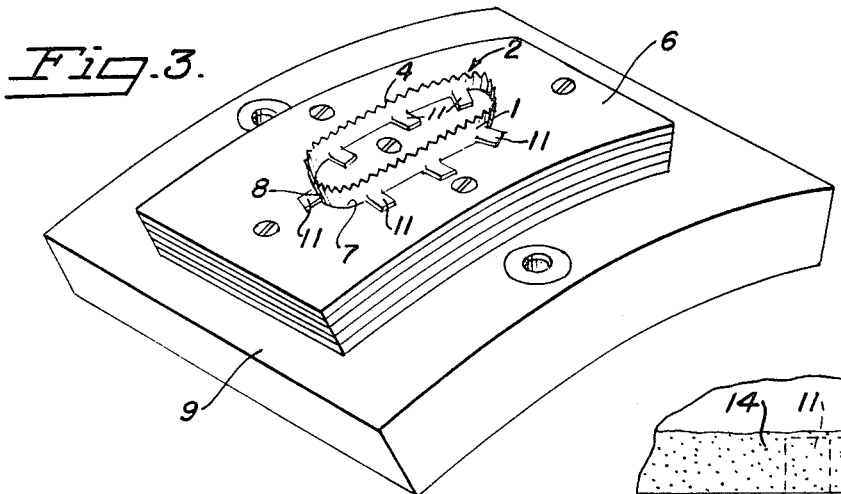
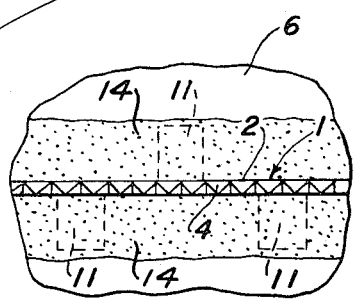
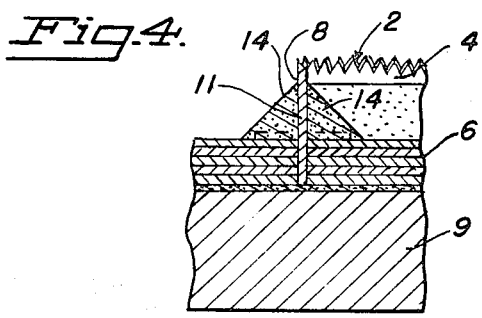
INVENTOR
MERRILL D. MARTIN
BY George B. White
ATTORNEY United States Patent Office 3,395,598
Patented Aug. 6, 1968

3,395,598
DIE RULES
Merrill D. Martin, 2 Mall Court,
Oakland, Calif. 94611
Filed July 28, 1965, Ser. No. 475,400
2 Claims. (Cl. 83—663)

This invention relates to die rules.

In connection with die rules, particularly of the type shown in United States Letters Patent No. 3,170,358, granted to Merrill D. Martin on Feb. 23, 1965, there is a slight flexing of the projecting or exposed portion of the die rule.

It is the object of the invention to provide a fillet on each side of the exposed portion of the die rule which stiffens the die rule and prevents rule flexing and which also will result in pre-loading the die rule on the base.

Another object of the invention is to provide such stiffening fillets on the opposite sides of the exposed portion of the die rule at such an angle or bevel that it will also prevent the climbing or sticking of the blank on the exposed portion of the die rule.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a perspective developed view of the mounting block, the die rule and the cut out plug to wedge the die rule into the slot in the mounting block.

FIG. 2 is a fragmental perspective view of the die rule on an enlarged scale.

FIG. 3 is a perspective view of the die rule assembled in the block.

FIG. 4 is a fragmental sectional view on an enlarged scale showing the die rule mounted on the mounting block.

FIG. 5 is a fragmental top plan view of the die rule on an enlarged scale.

As shown in the aforementioned Patent No. 3,170,358, the die rule is made out of a flat metal strip 1 which has a longitudinal cutting edge 2 and a longitudinal base edge 3. The cutting edge 2 may be provided with cutting serrations 4.

The die rule is bent into suitable shape to define the shape of the cut-out as required, and it is also bent, preferably in the manner shown in said patent, longitudinally so as to conform to the curvature or arc of the cylinder or rotating die cutter element about the axis of rotation of the usual rotary die cutter.

The die rule is mounted in a wooden base block 6 by fastening the die rule in a suitable slot 7 so that its cutting portion 8 projects above the base block 6. The wooden base block 6 is in turn mounted on a second base block 9 adapted to be secured to the periphery of the roller of the rotary cutter.

A cold, flowable plastic coating, which contains a setting or hardening agent, is utilized to fill all the spaces about the die rule and below the block so as to assure rigidity of the die rule in the block, as described in said patent.

The protruding portion 8 of the die rule has small flexibility, which, however slight, results in certain undesirable inaccuracies and roughness of cut. In order to counteract such flexibility, the herein illustrative embodiment of the invention provides a plurality of laterally and oppositely extended ears 11. In the present form as notches 12 are formed between adjacent legs 13, as shown in said patent, the cut-out metal forming the notches 12 is not punched out completely as shown in said patent, but instead the metal from each notch 12 is bent alternately in opposite directions to form the ears 11. Thus when the die rule is inserted in its slot the ears 11 spread over and bear upon the convex surface of the curved wooden base block 6 and thereby the resiliency of the ears 11 tends to preload and stiffen the protruding portion of the die rule against flexing.

Then the ears 11 are covered by a body of initially flowable and settable plastic such as epoxy shoulders 14 beveled at approximately 45 degrees alongside each side of the protruding portion of the die rule.

The result of the above method is a product which is a die rule mounted in the convex side of a curved wooden base block, the protruding cutting portion of which has on it a 45 degree beveled stiffening fillet on each side, which not only prevents the flexing of the protruding portion of the rule but also prevents the climbing of the blank upon the die rule.

I claim:

1. In a method of forming and mounting die rule on a rotating die cutter element for cutting blanks, the steps of
   (a) providing a base conforming to the peripheral curvature of rotation of said element,
   (b) tightly fitting the die rule in slots in said base conforming to the contour of the die rule,
   (c) applying a flowable material containing a hardening agent on the exposed convex surface of said base on opposite sides of said die rule to form a fillet on each side of the portion of the die rule protruding from the convex surface of said base and converging against the respective adjacent faces of the die rule thereby to form guides for said blank for preventing the climbing and sticking of said blanks on said base,
   (d) prior to the securing of the die rule into slots of said block, forming notches in the portion of the die rule to be inserted in said slots by partially cutting out spaced portions of the metal and then bending the partially cut out metal pieces toward the opposite sides of said die rule for engagement with the convex face of said base on opposite sides of the die rule when the die rule is inserted into said slots, and
   (e) in applying said flowable setting material about and around and over said oppositely bent pieces of metal.

2. In a die rule mounting for the rotating element of a die cutting device for cutting blanks,
   (a) the combination with a die rule formed of a strip of metal with a longitudinal cutting edge and an opposite base edge,
   (b) and a mounting block of arcuate cross-section conforming to part of a cylinder about the axis of rotation of said rotating element,
   (c) said mounting block having a cavity conforming substantially to the contour of said die rule,
   (d) means to secure said die rule in said cavity so as to leave a portion of said die rule protruding from the convex surface of said curved mounting block,
   (e) of a fillet of about 45 degrees formed on the outer convex face of said block along the opposite sides of said die rule, and
   (f) said fillets being formed of an initially flowable and settable material converging against the respective sides of said strip above said convex face of said block and below said cutting edge thereby to stiffen said protruding portion of said strip of metal and inhibit the climbing of the blanks upon said die rule,
(g) ears bent out of the die rule in opposite directions and bearing on the convex face of said mounting block so as to preload the protruding portion of the die rule and said ears being covered by said flowable and settable material.

References Cited

UNITED STATES PATENTS 3,345,898   10/1967   Dovey _____ 83—698 X

ANDREW R. JUHASZ, *Primary Examiner.*